Nov. 1, 1927.
C. P. HOPSON
1,647,626
EYEGLASS GLARE SHIELD
Filed Sept. 25, 1924
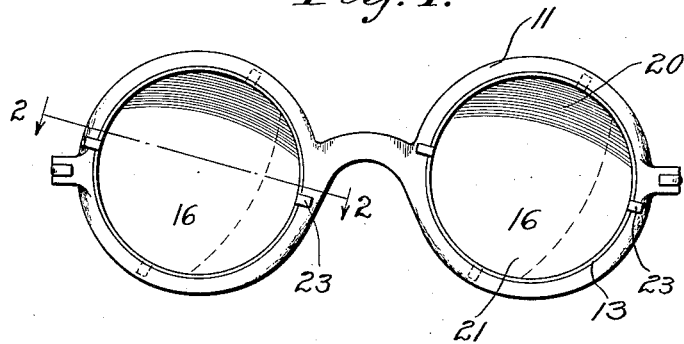
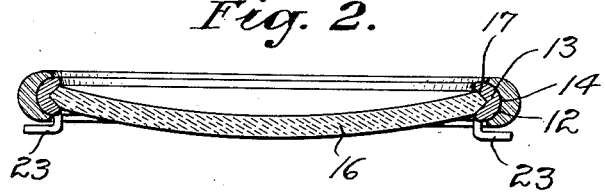
INVENTOR:
CLIFFORD P. HOPSON,
BY
*Graham + Lewis*
ATTORNEYS.

Patented Nov. 1, 1927.

1,647,626

UNITED STATES PATENT OFFICE.

CLIFFORD P. HOPSON, OF BAKERSFIELD, CALIFORNIA.

EYEGLASS GLARE SHIELD.

Application filed September 25, 1924. Serial No. 739,822.

This invention relates to glare-preventing devices; and it relates particularly to eyeglasses having glare shields associated therewith.

A device of this character is intended for use by persons who must face any source of light. For example, a person facing the sun, especially when travelling by water or across snow, is likely to be annoyed by the brilliant glares therefrom. My invention is, however, especially suitable for use by the drivers of vehicles, who are now often compelled to endure the annoying glare from the headlights of automobiles travelling in an opposite direction. It is acknowledged that many accidents are caused by the drivers being blinded by the glare from these approaching machines.

It is an object of one form of this invention to provide eyeglasses with means for eliminating the glare of light from the eyes of the wearer. A device of this character may comprise lenses having locally associated therewith nigrescent or dimming elements or portions of less area than said lenses and of such a nature that they will diminish the stronger of the light rays coming from a light source.

It is also an object of this invention to provide a device in which the glare-eliminating means, or the glare shields, whether or not used with lenses, are adjustable, to adapt the same to use under various circumstances.

Further objects of the invention and advantages thereof will be made evident hereinafter.

Referring to the drawings, which are for illustrative purposes only,

Fig. 1 is a front view of a pair of eyeglasses in which one form of my invention may be embodied.

Fig. 2 is a section taken on a plane as indicated by the line 2—2 of Fig. 1.

As shown in Figs. 1 and 2, the numeral 11 represents a frame, which may be of any well known form and may be made from any of the various suitable materials. The frame 11, resembling an ordinary eyeglass frame, may comprise annular elements that are crescent shaped in radial cross section (as best shown in Fig. 2) and may be so constructed as to provide annular channels 12, substantially as shown in Fig. 2. In the channels 12, there may be provided rotatable lens-retaining rings 13, which may have convex outer faces 14, arranged to cooperate with the channels 12. In each of the rings 13, there may be secured, in any suitable manner, a lens 16. One means for securing the lens 16 in the ring 13 is provided by beveling the periphery of the lens 16, as shown at 17 in Fig. 2. In this application the term "lens" is intended to imply nothing as to optical power, it being customary to apply this term even to flat pieces of glass having curved outlines, as used in spectacles, and the like. The lens 16 may be of any tinge, although it is customary, in glasses of this character, if used to protect the eyes from light, to provide lenses of slight color. A nigrescent portion or glare shield 20 may be provided independent of or integral with lenses 16, as shown in Fig. 1. The portion 20 may be of a crescent shape; but it should be understood that any shape desirable may be provided according to specific needs or tastes. The glare shield 20 may be assumed to be of a distinctly darker tinge than the other portion 21 of the lens, when the latter is present; but the portion 21 need be of only a slight color.

The rings 13, when employed, are preferably arranged to be rotatable in the frame 11, and I prefer to provide means whereby the rotation may be easily and quickly accomplished. For this latter purpose, I may provide any suitable means, for example the wings 23, best shown in Fig. 2 which may be easily engaged by the fingers to rotate the rings 13 and thereby the lenses 16, said wings overlying said rings and said frame.

It will be recognized that the positions of the sources of light which a person wearing these glasses may face are variable, and means of the character described permit corresponding adjustment of my glare shields. For example, a person walking in the sun may encounter a glare from above. By suitable manipulation, he may then adjust the portions 20, whether or not they are associated with complete lenses to positions near the upper part of the frames. A person driving a vehicle may adjust the portions 20 to the right or left side of the frames, as required to cut off glare from headlights, or the like.

By the provision of this unique glare shield, I have provided means capable of use with glasses and contributing to the purposes for which glasses are intended. By providing separate glare-excluding members, it is possible to equip any of the glasses now in use with my novel invention; and any usual or preferred material may be used in the construction of any of my glare-excluding members.

It should be understood that the term "nigrescent", as employed herein, is intended to be applicable to various materials, ranging between substantial opacity and complete transparency, if some rays or colors are excluded or diminished thereby; but, whether or not the glare-excluding material is supported by incorporation in or by partially overlying contact with a lens, it is intended to be local and non-circular and to be supported, preferably in a manner permitting independent adjustment or replacement, from a complete or incomplete frame of the spectacles or eyeglass type. And obviously, my glare-excluding elements, whether or not associated with a lens, may be manufactured and sold as a separate article of commerce, for association at will, as during driving, with a suitable frame of the general type mentioned.

Although I have herein described a complete embodiment of my invention, it will be understood that various modifications might be made by those skilled in the art, without the slightest departure from the spirit and scope of my invention, as the same is indicated above and in the following claims.

I claim as my invention:

1. In a glare-preventing device of the eyeglass type, the combination of: a frame resembling an ordinary eyeglass frame the annular elements thereof being crescent shaped in radial cross section; lens-retaining rings movable therein; rotating means for said rings; and lenses supported by said rings and having incorporated therewith means for locally excluding glare from the eyes of the wearer.

2. A glare-preventing device as in claim 1, in which said rotating means includes wings which are effective for rotating together said lenses and glare-excluding means, said wings overlying said rings and said frame.

3. In a glare-preventing device, the combination of: a frame of the eyeglass type, the annular elements thereof being crescent shaped in radial cross section; lenses rotatable therein; glare shields supported from said lenses; and a lens-supporting ring, interposed between said frame and said lenses, and provided with forwardly-projecting means to facilitate its rotation, said last mentioned means being wings which overlie said frame and said ring.

In testimony whereof, I have hereunto set my hand at Bakersfield, California, this first day of July, 1924.

CLIFFORD P. HOPSON.